United States Patent [19]
Heckel et al.

[11] Patent Number: 6,034,612
[45] Date of Patent: Mar. 7, 2000

[54] CIRCUITRY AND PROCESS FOR TESTING NON-INTERMITTENT SIGNAL GENERATORS

[75] Inventors: Andreas Heckel, Waiblingen; Roland Rupp, Hattenhofen; Hans Dieter Schwenkel, Stuttgart, all of Germany

[73] Assignee: Pilz GmbH & Co., Ostfildern, Germany

[21] Appl. No.: 08/913,947
[22] PCT Filed: Feb. 1, 1996
[86] PCT No.: PCT/DE96/00146
  § 371 Date: Sep. 22, 1997
  § 102(e) Date: Sep. 22, 1997
[87] PCT Pub. No.: WO96/29609
  PCT Pub. Date: Sep. 26, 1996

[30] Foreign Application Priority Data

Mar. 22, 1995 [DE] Germany .......................... 195 10 332

[51] Int. Cl.[7] .................................................. G08B 21/00
[52] U.S. Cl. .......................... 340/657; 340/660; 340/658; 340/664; 340/661; 324/528; 324/555; 324/605
[58] Field of Search .................................... 340/657, 660, 340/661, 664, 658; 324/528, 555, 556, 605

[56] References Cited

U.S. PATENT DOCUMENTS

| | | | |
|---|---|---|---|
| 4,298,969 | 11/1981 | Rickenbacker | 367/76 |
| 4,538,137 | 8/1985 | Kimura | 340/512 |
| 4,922,184 | 5/1990 | Rosenstein | 324/72.5 |
| 5,543,997 | 8/1996 | Ruprecht | 361/93 |
| 5,615,216 | 3/1997 | Saeki | 371/22.1 |

FOREIGN PATENT DOCUMENTS

| | | |
|---|---|---|
| 0 505 774 | 3/1992 | European Pat. Off. . |
| 94 11 982 | 7/1994 | Germany . |
| WO 94/0071 | 1/1994 | WIPO . |

OTHER PUBLICATIONS

Timer ICs and LEDs Form Cable Tester, L.W. Herring, Electronics May 1973, vol. 46, Nr. 10, pp. 115–116.

*Primary Examiner*—Daniel J. Wu
*Attorney, Agent, or Firm*—Nilles & Nilles SC

[57] ABSTRACT

In the case of a multichannel monitoring device for monitoring system operating states, a test input (45a, 45b) is provided per channel (2, 3) on an evaluation and monitoring circuit for the purpose of testing the supply leads (7a, 7b) to the signalling units (1a, 1b) for freedom from damage. Either no filters or filters (47a, 47b) with a short settling time are provided in the supply lead to this test input (45a, 45b). As a result, testing requires only a very short time, so that the evaluation of the signalling units (1a, 1b) is interrupted only for a very short time. The time is so short that no dangerous system states can occur.

20 Claims, 2 Drawing Sheets

CIRCUITRY AND PROCESS FOR TESTING NON-INTERMITTENT SIGNAL GENERATORS

BACKGROUND OF THE INVENTION

1. Field of the Invention

With controllers, it is necessary to distinguish between intermittent and non-intermittent sensors or signalling units. In the case of intermittent signalling units or sensors, a functional test can be achieved with the aid of a plausibility test of the signal coming from these sensors or signalling units. This is not so, however, with the so-called non-intermittent sensors or signalling units, which supply an unchanged continuous signal over a long period of time. A simple example of such a sensor or signalling unit is a door contact switch, which in the cases both when the door is open and when it is closed emits a continuous signal as long as the operating state of the door does not change.

On the other hand, however, it is very important even in the very case of such signalling devices to determine whether they are still operating satisfactorily or whether damage has occurred and, possibly, an operating state is being signalled which no longer corresponds to the true conditions. An example in the case of a door contact switch would be the short circuiting between the two door contact switches in the case of a two-channel monitoring circuit. The consequence would be that only one door contact switch has to be actuated, while the position of the other door contact switch is no longer important. From the point of view of the evaluation circuit, both switches would be actuated as previously.

A further difficulty in the functional testing of the signalling units is caused by the amplitude or frequency filters normally required, the signal units being necessary satisfactorily to debounce and remove the interference from the signal coming from the signalling unit, in order to exclude damage to and maloperation of the inputs of the downstream evaluation circuit of the controller. These filters can have a substantial settling time. The signal at the output of the line which connects the signalling unit to the relevant evaluation circuit would have to be of a length corresponding to the filter settling time. This period is in conflict with the requirement to keep the testing time for the signalling unit as short as at all possible so that no dangerous operating states occur. To be precise, each extension of the testing time means that as long as the test is running the monitoring circuit does not detect if the signalling units signal a dangerous operating state of the monitored system. In addition, with multichannel monitoring devices the testing time is lengthened in accordance with the number of the channels, since all the signalling units monitoring the same station in a system must be tested simultaneously.

2. Description of the Related Art

By contrast, it is easier to handle transmission lines which are interconnected galvanically, transmit AC signals and, in addition, are connected at the end via transformers to the line drivers and line receivers. As shown in WO 94/00771, these lines can be tested with the aid of DC signals while the AC voltage transmission is proceeding simultaneously. Provided for this purpose at both ends of the line in each case is a balun which is connected at one end to the transmission line and at the other end to a symmetry transformer. Connected for the purpose of electrical interruption in the connecting line between the symmetry transformer and the balun is a capacitor which passes the useful AC voltage signal and to which the DC voltage used for testing is applied for testing purposes. This DC voltage can be tested for polarity and amplitude at the capacitor at the other end of the line. It is determined in this way whether the line is connected satisfactorily, interrupted or else has a cross.

Another possibility for testing a multi-core cable is described in the article "Timer IC's and LEDs for Cable tester", which appeared in "Electronics" 1973, pages 115 ff. A ring counter is connected to one end of a cable, while the other cable end is connected to one base of a transistor complementary stage. The other base is connected directly to the relevant output of the ring counter, which has a stage for each core in the cable. Depending on the routing conditions in the cable, there is a different current direction through a double LED connected in parallel with the transistors.

However, it is not possible using this test device to test the cable in the state of use. Rather, it has to be taken out of the transmission link.

OBJECTS AND SUMMARY OF THE INVENTION

Starting from here, it is the object of the invention to provide a monitoring device which can be used to perform quick tests of the signalling units or sensors belonging to the monitoring device. Moreover, it is the object of the invention to specify a corresponding method.

On the basis of the special configuration of the monitoring device, the signalling units and their supply leads are tested, as it were, from the rear or by using a short settling time, as a result of which the settling times of the filters contained at the signal outputs for normal operation can be largely eliminated. For example, with the aid of the novel circuit arrangement except for the power supply input of one signalling unit, all the remaining signalling units are loaded at the power supply input with a defined impedance, after which the voltage present at these loaded power supply inputs is tested. This circuit state is carried out cyclically for all the signalling units, in order to test whether there is a short circuit to the supply voltage. In such a case, parasitic voltages are formed from that signalling unit which receives a supply voltage to a signalling unit which is loaded with a defined impedance. This formation of parasitic voltages can be detected at once. Since the testing is performed on the feed side of the signalling units and not on the side of the signal output, the settling times which are present between the output of the signalling unit and the normal input of the downstream evaluation circuit are largely eliminated. It is possible to use substantially quicker filters which suppress only interference signals but are not designed to suppress possible longer bounce times.

On the other hand, the novel circuit arrangement also permits the detection of a range of ground faults situated between the signalling unit and the voltage source driving the respective signalling unit.

If, for example, with a signalling unit or sensor which is open, damage occurs to the supply cable with the consequence of a short circuit to earth, this fault can be detected at once. Applying the supply voltage to this defective cable and testing the input voltage lead to diagnosis of the fault because the supply voltage does not rise in the expected way. Instead, it is loaded by the short circuit, and this leads, in combination with the internal impedance of the voltage source or the means for varying the voltage, to a corresponding voltage drop.

In a simple embodiment of the circuit arrangement, the means for varying the voltage and the voltage sources are identical, that is to say use is made of a voltage source whose output voltage can be switched over. Such a voltage source whose output voltage can be switched over is, for example, a push-pull circuit comprising two transistors whose series circuit is connected between the supply voltage and the circuit ground. Depending on which of the two transistors is driven, the voltage source either supplies the normal supply voltage, or it grounds its voltage output with a defined internal impedance. The detection of faults in the supply leads and the signalling units is simplified if the internal impedance with which the signalling units are fed depends on the current flow direction. As a result, the settling times when switching over to the normal supply voltage are shortened while, on the other hand, the line can be discharged without short circuiting parasitic voltages directly to ground.

Dangerous parasitic voltages can be avoided if the evaluation circuit is coupled to the power supply input of the signalling unit or the output of the associated voltage source via an optocoupler.

If the signalling unit also permits a detectable current in the reverse direction from the signal output to the power supply input, it is also possible to detect cable damage which is situated between the signalling unit and the normal input of the associated evaluation circuit. This is always ensured in any case where simple switches are concerned. However, should the signalling unit not have this ability of itself, in some circumstances the use of an appropriately poled diode suffices to provide this function.

For the rest, developments of the invention are the subject-matter of the subclaims.

BRIEF DESCRIPTION OF THE DRAWINGS

Exemplary embodiments of the subject-matter of the invention are represented in the drawings, in which.

DESCRIPTION OF THE PREFERRED EMBODIMENTS

Figure 1:
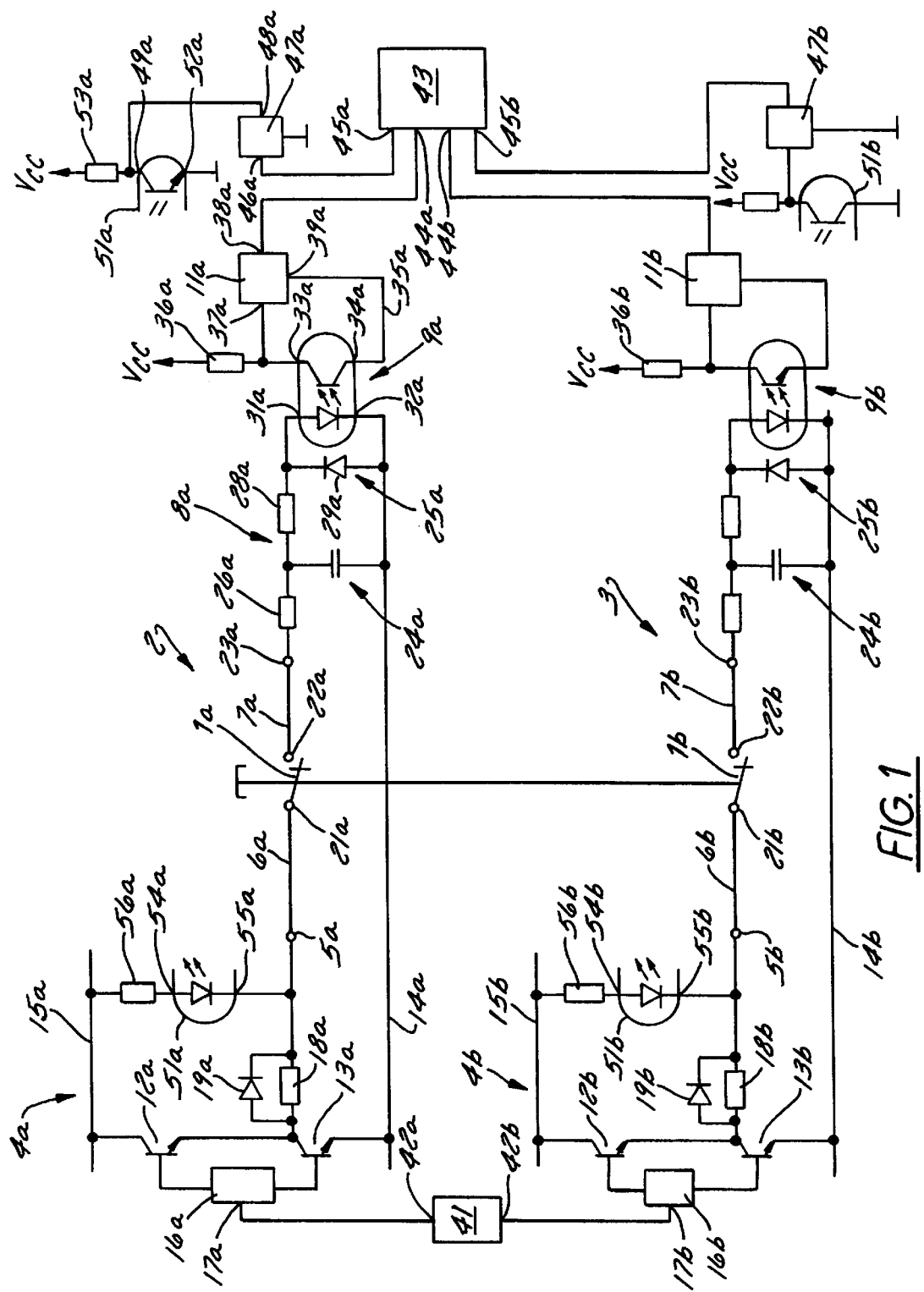
FIG. 1 shows a block diagram of the novel monitoring device, the signalling units being tested from the feed side.

An excerpt from a machine controller is illustrated as a block diagram in FIG. 1; specifically that region which serves to monitor a specific station of the controlled system with the aid of two signalling units 1a, 1b is shown by way of example. The monitored station is, for example, the access door in a protective fence behind which a machine is located. The monitoring device shown contains a channel 2 and a channel 3, which are of identical design. For this reason, the same reference symbols are used for the components of the two channels 2 and 3, being supplemented by "a" or "b" for distinguishing purposes. The following explanation of the design relates initially to channel 2.

Channel 2 contains a voltage source 4a to whose current output 5a the signalling unit 1a is connected via a line 6a. A further line 7a leads from the signalling unit 1a to a first input filter 8a, which is connected on the output side to a further filter 11a via an optocoupler 9a.

The voltage source 4a comprises two NPN transistors 12a and 13a connected in a cascade, the transistor 13a being connected with its emitter to a circuit ground 14a. A connection leads from the collector of the transistor 13a to the emitter of the transistor 12a, whose collector is connected to a positive supply voltage 15a. The two bases of the transistors 12a and 13a are connected to a phase-reversal stage 16a which has a control input 17a. A resistor 18a leads to the current output 5a from the collector of the transistor 13a or the emitter of the transistor 12a, there being connected in parallel with the resistor 18a a diode 19a whose cathode is likewise connected to the current output 5a.

With the aid of this voltage source 4a, it is either possible via an appropriate binary control signal at the input 17a for the current output 5a to be grounded to the circuit ground 14a via the resistor 18a and transistor 13a, or in another state of the signal at the control input 17a the transistor 13a is blocked and the transistor 12a is turned on, so that the control output 5a receives voltage from the power supply line 15a via the resistor 18a.

In the case shown, the signalling unit 1a is a simple switch with a power supply input 21a and a signal output 22a. The current input 21a is connected via the line 6a already mentioned to the current output 5a. Like the line 7a, the line 6a is of substantial length. The length depends on the distance between the signalling unit 1a and the site at which the monitoring circuit or the machine controller is located. The lengths of the lines are normally a few meters to a few tens of meters. Appreciable parasitic interference must be expected. The line 7a is therefore also connected to an input terminal 23a of the filter 8a, which comprises an RC low-pass filter 24a and an amplitude filter 25a. The RC low-pass filter 24a contains an ohmic resistor 26a which is connected to the input terminal 23a and whose other end is connected to the circuit ground 14a via a capacitor 27a. A further limiting resistor 28a leads from the connecting point between the resistor 26a and the capacitor 27a to a diode 29a whose anode is connected to the circuit ground 14a. The optocoupler 9a is connected in parallel with the diode 29a with its input terminals 31a and 32a. The result of this is to achieve electrical isolation with respect to the circuit following on the right in the circuit diagram.

The optocoupler 9a has two output terminals 33a and 34a, the output terminal 34a leading to a further circuit ground 35a, while the output terminal 33a is connected to a supply voltage $V_{cc}$ via load resistor 36a. The output signal, which passes into an input 37a of a further filter 11a, is tapped at the connecting point between the resistor 36a and the output terminal 33a. This filter 11a has a signal output 38a and a ground terminal 39a.

The channel 3 already mentioned is designed with the same components in an identical circuit. Present in common for both channels 2 and 3 is a test control circuit 41 with two control outputs 42a and 42b which are connected to the control inputs 17a and 17b, respectively, of the phase-reversal stage 16a and 16b, respectively.

Furthermore, for both channels 2 and 3 there is a common control and evaluation circuit 43 having two normal inputs 44a and 44b, which are interrogated in normal operation, and having two test inputs 45a and 45b, which are interrogated in the test mode described further below. The normal input 44a is connected to the output 38a of the filter 11a, while the test input 45a leads to an output 46a of a filter 47a whose input 48a is connected to an output terminal 49a of an optocoupler 51a. A further output terminal 52a of the optocoupler 51a is connected to the circuit ground 35a, while the output terminal 49a is connected to the second supply voltage $V_{CC}$ via a load resistor 53a.

The input side of the optocoupler 51a with input terminals 54a and 55a is connected to the current output 5a and, via a resistor 56a, to the supply voltage 15a.

The same design applies in turn analogously for channel 3.

Although the circuit diagram is shown only with two channels 2 and 3, it is also possible to use three parallel-connected channels in order to enhance the safety even further. This third channel would then in turn have the same design as channel 2, and the circuits 41 and 43 common to the two channels would respectively have a further third output or a further normal input and a further test input.

With regard to the mechanical design, it is further important to mention that the two voltage sources 4a and 4b are accommodated together with the test control circuit 41 in the spatial vicinity of the filters 8a, 11a, 47a and the evaluation and control circuit 43, for example in the same housing. The current output 5a and the input 23a are consequently also directly adjacent, and the two lines 6a and 7a are a two-wire connection. The block diagram according to FIG. 1 therefore does not reproduce the true spatial conditions, but only the electrical conditions.

Finally, it remains to be stated that the test control circuit 41 and the evaluation and control circuit 43 are realized in microprocessors or microcomputers, or represent program parts in a single microcomputer or microprocessor. The way in which these circuits 41 and 43 are designed in terms of hardware depends on the respective application and, moreover, has no repercussions for the invention.

The mode of operation of the monitoring device thus described is as follows:

Normal Operation

In normal operation, the evaluation and control circuit 43 evaluates the operating state of the two signalling units 1a and 1b, that is to say the sensor, designed as a switch, with the aid of which, as mentioned above, for example, the position of a protective door or an access door is monitored. If the danger area is closed, the two switches 1a and 1b are likewise closed, that is to say closed-circuit signalling units are concerned here.

In order to realize this function, the evaluation and control circuit 43 controls the test control circuit 41 in such a way that the latter emits at its outputs 42a and 42b the binary signals with a state intended to turn on the transistor 12a or 12b via the phase-reversal stages 16a and 16b, respectively, while the respective other transistor 13a or 13b is switched into the blocking state. The current output 5a is thus at the potential of the supply voltage 15a.

This current/voltage signal supplied from the voltage source 4a passes via the line 6a to the signalling unit 1a and on from there via the line 7a into the input 23a of the filter 8a. With the aid of the filter 8a, or in the other channel 3 with the aid of the filter 8b, the voltage signal which is passed into the input 23a or 23b, respectively, is freed from radio-frequency disturbing pulses and impermissible voltage peaks before it is fed into the optocoupler 9a. From here, the signal passes through a further filter 11a, likewise with a low-pass characteristic, and possibly after pulse shaping into the normal input 44a or 44b in the case of the other channel 3. The filter 11a or 11b is intended to suppress the remaining interference, and to debounce the signal. The filters 11a and 11b have a correspondingly low cut-off frequency.

The evaluation circuit 43 tests continuously in normal operation whether the two channels 2 and 3 signal the same positions of the switches 1a and 1b in the two channels 2 and 3 inside a stipulated time window. If one of the switches 1a or 1b fails, or if the controlling voltage source 4a or 4b fails, inequality arises between the signals at the normal inputs 44a and 44b, and this causes the evaluation and control circuit 43 to detect a fault, which entails immediate stoppage of the entire system.

The filter 11a simultaneously has the function of suppressing the disturbing pulses inevitably occurring in mechanical switches, which occur when the switch 1a or 1b is closed and bounces in the process. The consequence of this is that two filters 8a and 11a and the corresponding filters in channel 3 have a comparatively long settling time. The settling time is in the region of around 1 to 5 ms, so that because of this long settling time functional tests can either not run at all, or can run only very seldom, via this chain of the filters 8a and 11a, because the state of the two switches 1a and 1b necessarily cannot be interrogated during the test. A special test mode is therefore provided in which the evaluation and control circuit ignores the signals arriving at the normal inputs 44a and 44b during the test phase.

Test Phase

When doors or comparable parts of a system are monitored, it is natural that the appropriate switches, that is to say the two switches 1a and 1b, are actuated only extremely seldom in comparison and do not change their circuit state for a long time. Faults which occur in the supply leads 6a and 7a or 6b and 7b, respectively, remain undetected for a long time correspondingly if no special arrangements are made. The evaluation and control circuit 43 periodically switches on the test mode in order to be able to detect damage early. In the test mode, the evaluation and control circuit 43 causes the test control circuit 41, for example in channel 2, to turn off the transistor 12a and to turn on the transistor 13a. If there is no short circuit between the lines 6a and 7a, on the one hand, and the lines 6b and 7b, on the other hand, the voltage at the current output 5a, which is now grounded with the resistor of the ohmic resistor 18a, must vanish within a stipulated time. There is a corresponding increase in the voltage drop on the input side of the optocoupler 51a, which relays this change in voltage into the test input 45a via the filter 47a.

The filter 47a is necessary only if relatively high radio-frequency interference which is to be kept away from the test input 45a is to be expected. In any case, the filter 47a has a substantially higher cut-off frequency and therefore settles more quickly by at least a factor of 10 than the series circuit comprising the filters 8a and 11a. In particular, the filter 47a does not need to take account of the possibly long-lasting bounce times of the mechanical switches 1a and 1b. The evaluation circuit therefore obtains very quickly at the test input 45a knowledge of whether in accordance with a defective electrical connection the voltage at the current output 5a vanishes at once.

If, as a consequence of pinching of the cable, there is a cross connection, for example from the line 6a to the line 6b, the voltage of the current output 5b is transferred via this short circuit to the current output 5a as a parasitic voltage, that is to say although the transistor 13a is conducting, a relatively high voltage is produced at the current output 5a and its presence is signalled within a very short time via the optocoupler 51a to the test input 45a of the evaluation and control circuit 43. The evaluation and control circuit 43 thus detects the error, and is efficiently able to shut down the system which is no longer operating properly.

After this test cycle has been run through, the test control circuit 41 ensures that the transistor 12a is turned on again after the transistor 13a was blocked. For channel 3, the transistor 13b is likewise turned on and the transistor 12b turned off, in order also to have the same test run in channel 3. At the same time, the functional ability and controllability of the other voltage source 4b is also tested, and short circuits can be detected with a diode characteristic. The reciprocal thorough testing of each individual channel is particularly necessary whenever at least a third channel is further present, because then short circuits can occur between channel 2 and the further channel or channel 3 and the further channel, and these cannot be detected merely by testing channel 2.

The general appearance of the test algorithm for n channels is such that during the test phase all n voltage sources 4 are firstly switched off via the test control circuit 41 and then one voltage source 4 after another is respectively switched on individually sequentially, that is to say in a 1-of-n procedure. In the nondamaged state, no voltages may then occur at the other current outputs 5.

Because of the extremely short settling time of the filter 47a, this test can be run very quickly. Because the line 6a and 7a is tested virtually from the rear, this test circumvents the filter circuit 8a and 11a.

Furthermore, it is possible using the novel arrangement also to detect short circuits between the line 6a and the circuit ground 14a, or 6b and the circuit ground 14b, with switches 1a and 1b open. If such a short circuit is present, the voltage at the current output 5a collapses, although the relevant voltage source 4a is switched into a state in which it would supply current per se. The voltage state at the current output 5a is immediately transmitted in turn by the optocoupler 51a to the relevant test input 45a so that the evaluation and control circuit 43 can take the necessary measures.

If, as shown, the signalling unit used is not a single switch which can also conduct the current reciprocally, it is possible to connect an appropriately poled diode in parallel with the signalling unit so that even damage to the line 7a can be detected from the current output 5a.

Figure 2:
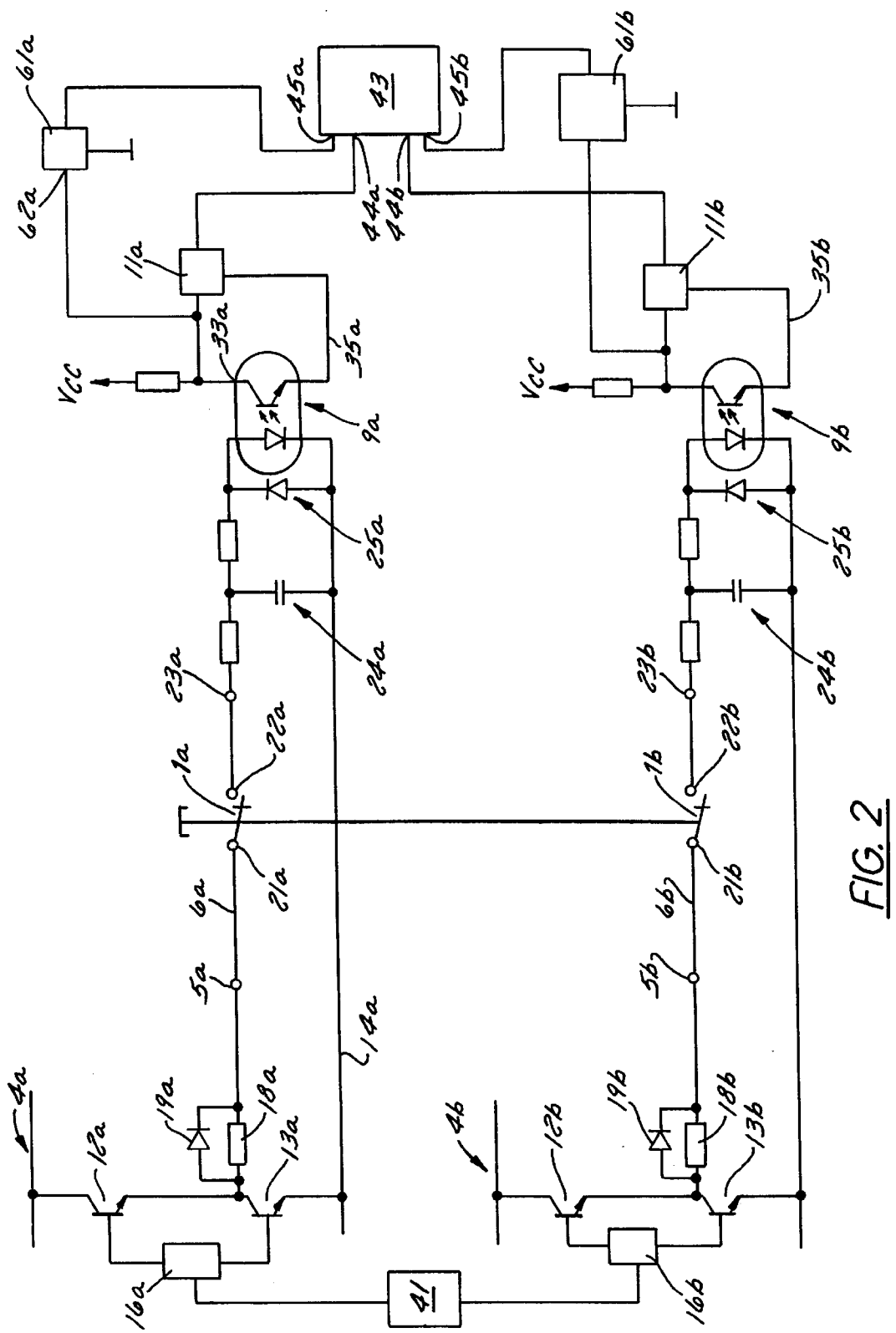
FIG. 2 shows a block diagram of the novel monitoring device, the signalling units being tested from the signal output.

FIG. 2 shows an alternative embodiment which is likewise suitable for quick testing and which differs from FIG. 1 in that instead of the optocoupler 51, use is made of filters 61a and 61b whose input 62a is directly connected to the output 33a of the optocoupler 9a. On the output side, the filter 61a is connected to the alreadymentioned test input 45a of the evaluation and control circuit 43. It is possible in this way to circumvent the long settling time of filter 11a, which in some circumstances is relatively long. Otherwise, the test crosses between lines 6a, 7a, on the one hand, and lines 6b, 7b, on the other hand, run in the same way as is explained above in conjunction with FIG. 1. The sole difference resides in the fact that no test is possible with contacts 1a and 1b open, because no current can flow.

Finally, it may be mentioned that filters 11a, 47a and 61a can naturally also be realized as software filters in the microprocessor-based evaluation and control circuit 43. Inputs 44 and 45 then correspond to corresponding switches in the program, depending on whether the filter function is to be performed with a large or small time constant.

It is important in any case that the connection between current output 5a and input 23a is tested for the purpose of testing freedom from damage with other filters or filter constants, so that monitoring by the signalling units 1a and 1b is interrupted only for a very short time. The time must be so short that no dangerous system states can occur.

In the case of a multichannel monitoring device for monitoring system operating states, a further test input is provided per channel on the evaluation and monitoring circuit for the purpose of testing the supply leads to the signalling units for freedom from damage. Either no filters or filters with a short settling time are provided in the supply lead to this test input. As a result, testing requires only a very short time, so that the evaluation of the signalling units is interrupted only for a very short time. The time is so short that no dangerous system states can occur.

What is claimed is:

1. A device for monitoring a machine to facilitate safe operation of the machine, the monitoring device comprising:
    at least two channels for monitoring system operating states, each channel having,
        a voltage source including a current output which is decoupled from said current outputs of said other voltage sources of said other channels,
        a signalling unit having a power supply input coupled to said current output via a first line, and a signal output, and
        means for varying the voltage fed into the first line;
    a test control circuit common to all said channels, said control circuit having a plurality of control outputs, each one of the control outputs corresponding to a different one of the channels, said control circuit controlling each said varying means such that,
        while no test cycle is running, all the signalling units are supplied with voltage, and
        during a test cycle, either (1) each signalling unit is sequentially supplied with voltage in an intermittent temporary fashion, such that only one of the signalling units is supplied with voltage at a time, or
        (2) only one of the signalling units is not supplied with voltage at any one time, such that during the test cycle each signalling unit sequentially receives no voltage in an intermittent temporary fashion, or (3) the cycles (1) and (2) are performed sequentially or in an interleaved fashion; and
    an evaluation and control circuit having, per signalling unit, at least one normal input and at least one test input, the normal inputs generally continuously evaluating the operating state of the signalling units during normal operation, and the test inputs each receiving a signal which is derived from a voltage signal which is present at the power supply input of a corresponding one of the signalling units.

2. The monitoring device according to claim 1, wherein the test inputs of the evaluation and control circuit are connected to corresponding ones of the current outputs.

3. The monitoring device according to claim 1, wherein each said varying means, in one operating state, relays the voltage of the corresponding voltage source essentially unchanged to the corresponding signalling unit.

4. The monitoring device according to claim 1, wherein each said varying means, in one operating state, loads the power supply input of a corresponding one of the signalling units with a predetermined impedance.

5. The monitoring device according to claim 1, wherein the voltage sources are connected to a common power supply.

6. The monitoring device according to claim 1, wherein each said varying means has an internal impedance which depends on a direction of the current flow.

7. The monitoring device according to claim 1, wherein each said varying means forms the corresponding voltage source.

8. The monitoring device according to claim 1, wherein each said varying means has first and second electronic switches which are connected in a push-pull fashion, said first electronic switch being connected to said common power supply and said second electronic switch being connected to a circuit ground.

9. The monitoring device according to claim 1, wherein each said signalling unit is connected via one of said second lines to a corresponding one of the normal inputs of said evaluation and control circuit.

10. The monitoring device according to claim 1, wherein each said signalling unit is conductive in the reverse direction from said corresponding signal output to said corresponding power supply input.

11. The monitoring device according to claim 1, wherein each test input of the evaluation and control circuit is connected to a corresponding one of a plurality of second lines which connect a corresponding one of the signalling units to a corresponding one of the normal inputs.

12. The monitoring device according to claim 11, wherein either the voltage source or said varying means of one of said channels has a predetermined internal impedance which is larger at least by a factor of 1.5 than a circuit impedance, said circuit impedance defined as the impedance measured between the corresponding power supply input and the corresponding signal output plus the resistance of corresponding ones of said first and second connecting lines.

13. The monitoring device according to claim 1, further including a plurality of normal filters each one being electronically connected upstream of a corresponding one of the normal inputs, and a plurality of optocouplers each one being connected upstream of either a corresponding one of said normal inputs or a corresponding one of said test inputs.

14. The monitoring device according to claim 13, further including a plurality of test filters, each test filter being connected upstream of a corresponding one of said test inputs of said evaluation and control circuit.

15. The monitoring device according to claim 14, wherein the settling time of said test filters is shorter than the settling time of said normal filters.

16. The monitoring device according to claim 14, wherein at least some of said test filters and said normal filters are implemented using software.

17. A method for testing a device for monitoring a machine to facilitate safe operation of the machine, the device including at least two channels each having a signalling unit with a power supply input and a signal output, and a voltage source which is decoupled from the voltage sources of the remaining channels, the method comprising the steps of:

(a) while no test cycle is running supplying all the signalling units with voltage so as to allow normal operation of the monitoring device; and (b) during a number of test cycles corresponding to the number of channels either, supplying only one of the signalling units with voltage during each test cycle such that the method, during the test cycles, supplies each signalling unit with voltage sequentially and intermittently, or not supplying only one of the signalling units with voltage during a test cycle, while supplying the remaining signalling units with voltage, such that each signalling unit sequentially receives no voltage in an intermittent fashion during the test cycles, or performing said supplying and said not supplying steps sequentially or in an interleaved fashion.

18. The method of claim 17, wherein the voltage is tested at the power supply input of one of the signalling units in which, during the test cycle, the supply voltage is connected in a state other than the normal operating state of that signalling unit.

19. The method of claim 17, wherein the voltage is tested at the power supply input of one of the signalling units in which, during the test cycle, the supply voltage is connected in a state which corresponds to the normal operating state of that signalling unit.

20. A device for monitoring a machine to facilitate safe operation of the machine, the monitoring device comprising:

at least two channels for monitoring system operating states, each channel having, a voltage source including a current output which is decoupled from said current outputs of said other voltage sources of said other channels, and a signalling unit having a power supply input coupled to said current output via a first line, and a signal output;

a test control circuit common to all said channels, said control circuit controlling the voltage applied to each said signalling unit such that, while no test cycle is running, all the signalling units are supplied with voltage, and during a test cycle, either (1) each signalling unit is sequentially supplied with voltage in an intermittent temporary fashion, such that only one of the signalling units is supplied with voltage at a time, or (2) only one of the signalling units is not supplied with voltage at any one time, such that during the test cycle each signalling unit sequentially receives no voltage in an intermittent temporary fashion, or (3) the cycles (1) and (2) are performed sequentially or in an interleaved fashion; and an evaluation and control circuit having, per signalling unit, at least one test input, the test inputs each receiving a signal which is derived from a voltage signal which is present at the power supply input of a corresponding one of the signalling units.

* * * * *